(12) United States Patent
Shogome

(10) Patent No.: US 9,471,580 B2
(45) Date of Patent: Oct. 18, 2016

(54) FILE MANAGEMENT APPARATUS, FILE MANAGEMENT METHOD, AND PROGRAM

(75) Inventor: Kohei Shogome, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/596,843

(22) Filed: Aug. 28, 2012

(65) Prior Publication Data
US 2013/0110889 A1 May 2, 2013

(30) Foreign Application Priority Data
Oct. 31, 2011 (JP) .................. 2011-239461

(51) Int. Cl.
*G06F 7/00* (2006.01)
*G06F 17/30* (2006.01)

(52) U.S. Cl.
CPC .............. *G06F 17/30115* (2013.01)

(58) Field of Classification Search
CPC .. G06F 17/30; G06F 12/00; G06F 17/30067; G06F 17/30115; G06F 12/0866; G06F 17/30227; G06F 11/1441; G06F 17/30135; G06F 17/30952; G06F 17/30955
USPC .................. 707/822, 826
See application file for complete search history.

(56) References Cited

U.S. PATENT DOCUMENTS

| 5,778,168 A * | 7/1998 | Fuller .................. 714/18 |
| 6,571,259 B1 * | 5/2003 | Zheng et al. | |
| 2004/0250172 A1 * | 12/2004 | Patel et al. .................. 714/42 |

FOREIGN PATENT DOCUMENTS

| JP | 2004-272608 A | 9/2004 |
| JP | 2008-269520 A | 11/2008 |

OTHER PUBLICATIONS

"Node.js Manual & Documentation" as retrieved from nodejs.org/api/fs.html and as indexed by archive.org on Jan. 29, 2011.*
"Fatty: A Reliable FAT File System" Liang Alei, Liu Kejia, Li Xiaoyong, Guan Haibing, Aug. 31, 2007.*
"A Fast File System for UNIX" Marshall K. McKusick, William N. Joy, Samuel J. Leffler, Robert S. Fabry, Mar. 8, 1984.*
"The Google File System" Sanjay Ghemawat, Howard Gobioff, Shun-Tak Leung, May 12, 2003.*
"ARIES: a transaction recovery method supporting fine-granularity locking and partial rollbacks using write-ahead logging" C. Mohan, Don Haderle, Bruce Lindsay, Hamid Pirahesh, Peter Schwarz, Jan. 3, 1992.*
K."Ceph: a scalable, high-performance distributed file system" Sage A. Weil, Scott A. Brandt, Ethan L. Miller, Darrell D. E. Long, Carlos Maltzahn, Aug. 11, 2006.*
Basis of flash memory and establishment of file system resistant to power failure; Interface Dec. 2004.

* cited by examiner

*Primary Examiner* — Azam Cheema
(74) *Attorney, Agent, or Firm* — Canon U.S.A., Inc. IP Division

(57) ABSTRACT

A file management apparatus updates areas to be updated when a file operation is performed by collectively writing out buffer caches into a storage device for each of the areas according to a recording order corresponding to the type of the file operation.

19 Claims, 14 Drawing Sheets

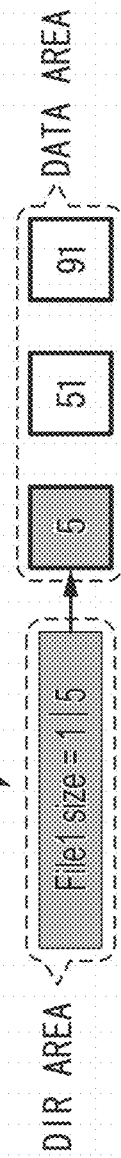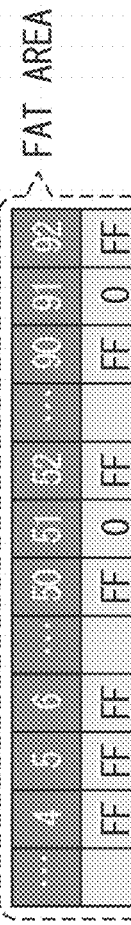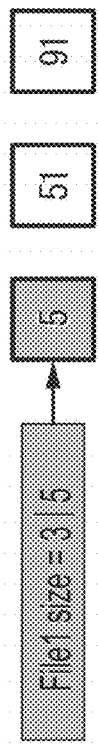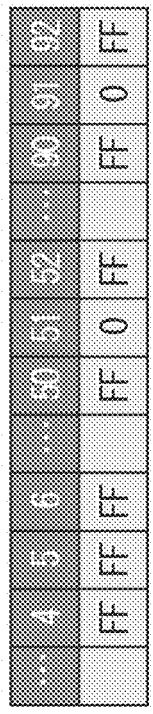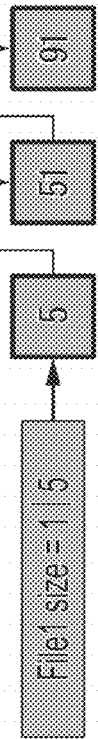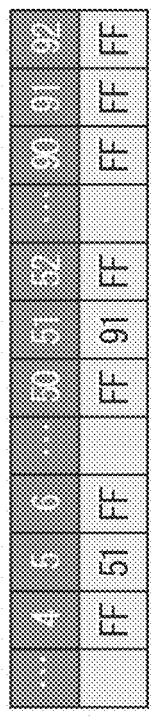
FIG. 5

FIG. 6
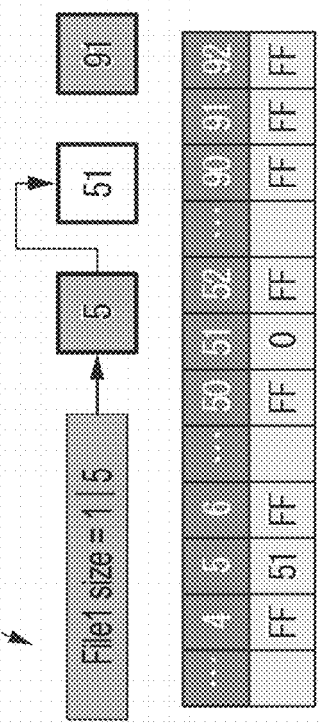
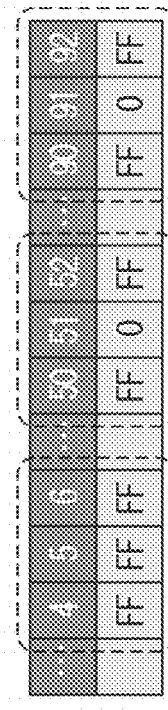
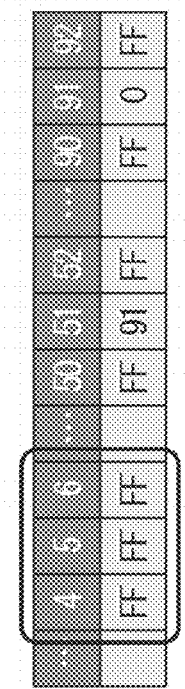
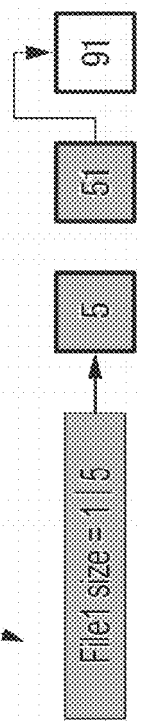

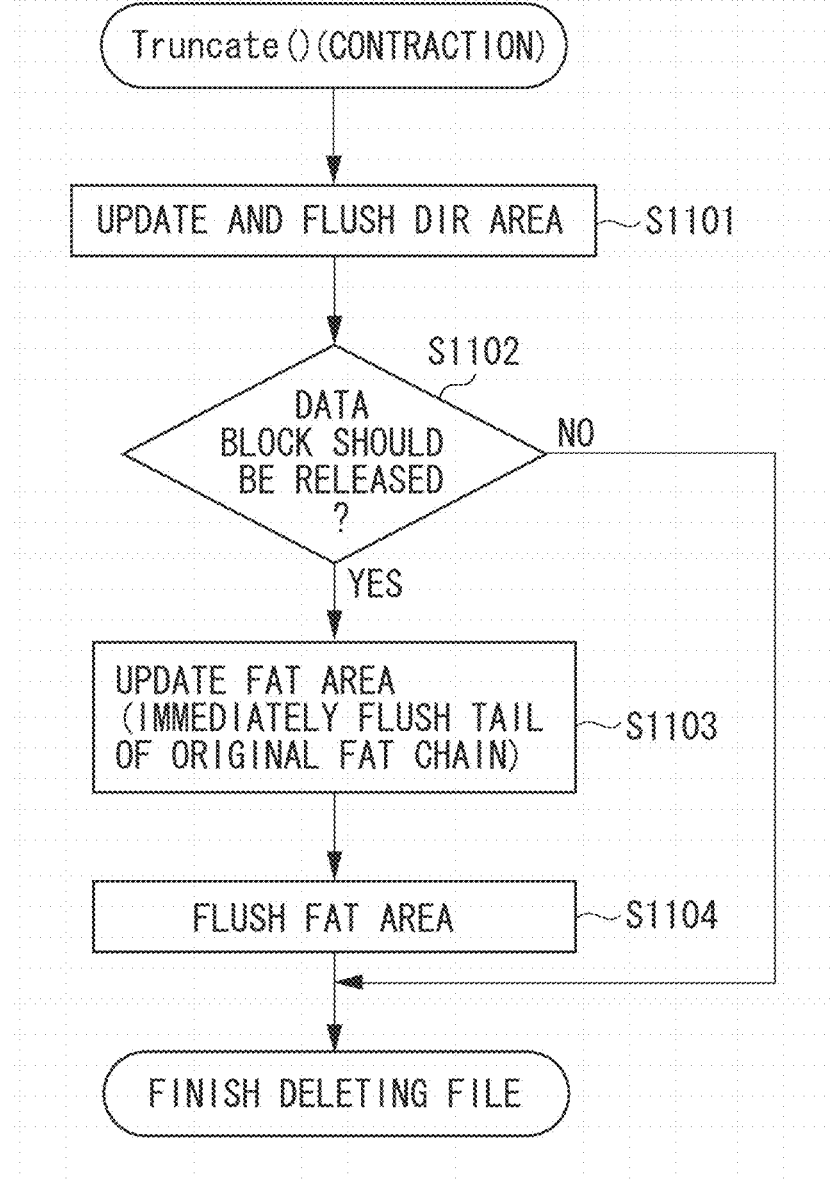

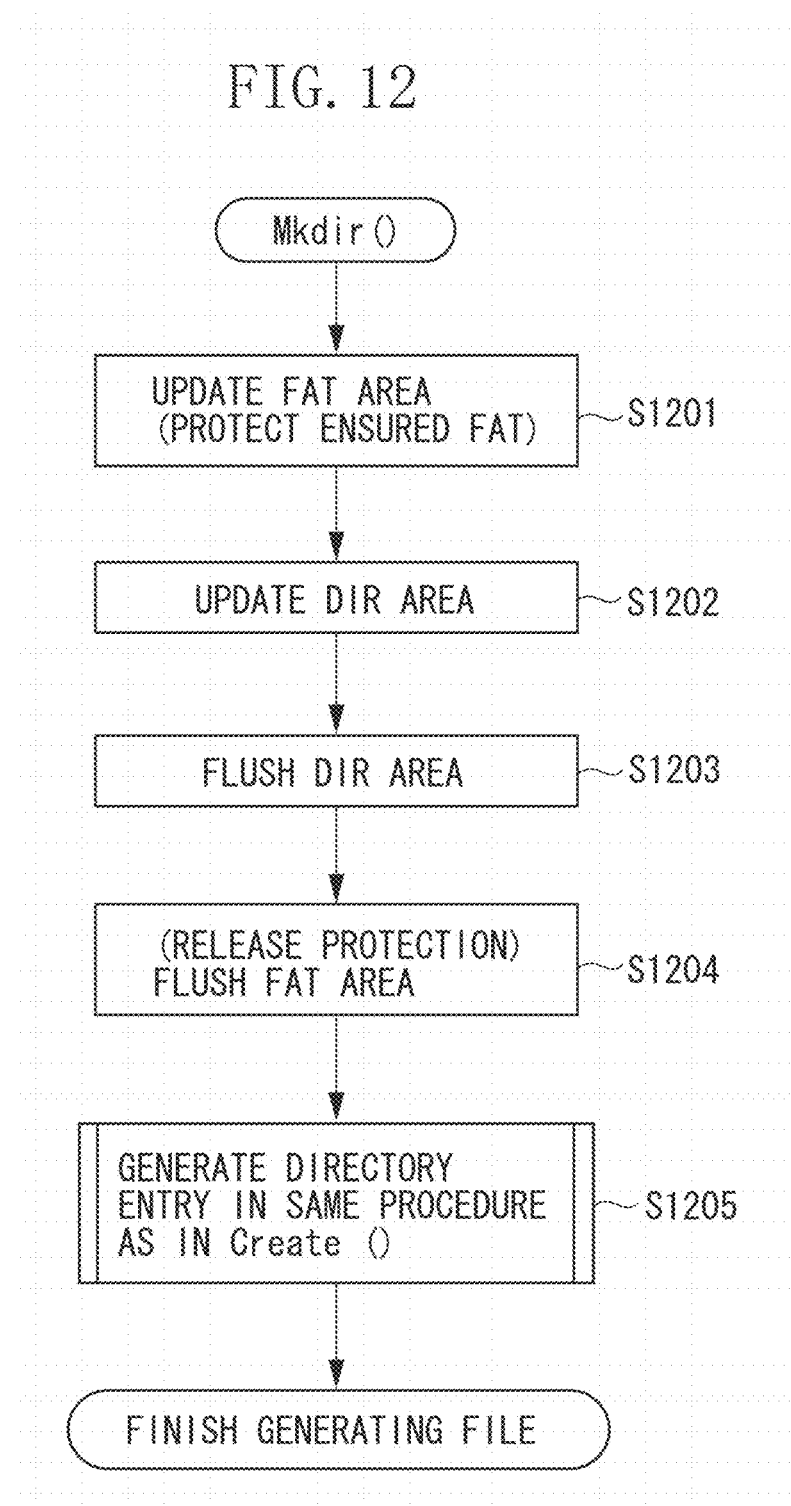

FIG. 13

| LIST OF TYPICAL APIs | DESCRIPTION | AREA TO BE UPDATED |
|---|---|---|
| Open() | OPEN FILE. GENERATE FILE IF NO FILE EXISTS. | DIR, FAT |
| Creat() | GENERATE FILE. | DIR, FAT |
| Write() | WRITE DATA INTO FILE. | DATA, DIR, FAT |
| Read() | READ DATA FROM FILE. | |
| Lseek() | DESIGNATE READ/WRITE POSITION OF FILE. | |
| Close() | CLOSE FILE. | |
| Unlink() | DELETE FILE. | DIR, FAT |
| Truncate() (EXPANSION) | EXPAND FILE. | DIR, FAT |
| Truncate() (CONTRACTION) | CONTRACT FILE. | DIR, FAT |
| Mkdir() | GENERATE DIRECTORY. | DIR, FAT |
| Opendir() | OPEN DIRECTORY. | |
| Readdir() | READ DIRECTORY. | |
| Opendir() | CLOSE DIRECTORY. | |
| Rmdir() | DELETE DIRECTORY. | DIR, FAT |
| Rename() | CHANGE NAME OF FILE DIRECTORY. | DIR |
| Chmod() | CHANGE ACCESS RIGHT OF FILE DIRECTORY. | DIR |
| Utime() | CHANGE TIME STAMP OF FILE DIRECTORY. | DIR |
| Start() | READ INFORMATION RELATING TO FILE DIRECTORY. | |

FIG. 14

| LIST OF TYPICAL APIs | FLUSH ORDER | TAIL OF FAT |
|---|---|---|
| Open() | DIR → FAT | SUSPEND |
| Creat() | DIR → FAT | SUSPEND |
| Write() | DATA → FAT → DIR | SUSPEND |
| Read() | | |
| Lseek() | | |
| Cbse() | | |
| Unlink() | DIR → FAT | SUSPEND |
| Truncate()(EXPANSION) | FAT → DIR | IMMEDIATE |
| Truncate()(CONTRACTION) | DIR → FAT | SUSPEND |
| Mkdir() | DIR → FAT | |
| Opendir() | | |
| Readdir() | | |
| Opendir() | | |
| Rmdir() | DIR → FAT | |
| Rename() | | |
| Chmod() | | |
| Utime() | | |
| Start() | | |

FILE MANAGEMENT APPARATUS, FILE MANAGEMENT METHOD, AND PROGRAM

BACKGROUND

Description of the Related Art

In recent years, an increased function has been required of a built-in system in a computer as a speed of a central processing unit (CPU) and memory capacity increase. When a storage device stores data, for example, a file system is naturally used to store a large amount of data and exchange data with a personal computer (PC).

In the built-in system, the file system having compatibility with a standard format may be used. As the file system, there is an FAT file system manufactured by Microsoft Corporation which can be said to be a de facto standard of the PC. The FAT file system is supported by a large number of built-in file systems for operating software (OS), with MS-DOS and Windows (registered trademark) at the top of the list.

The FAT file system includes actual data of a file and meta-data such as management information of a data block called a File-Allocation-Table (FAT) and index information of a file called a directory entry.

Generally in the file system, it is important to maintain consistency between meta-data. If power is disconnected because of a power outage or a storage device is demounted during a file operation, a part of the meta-data is missing without completing processing for the file operation, and the meta-data become inconsistent with each other. When the file operation is performed on a file in which meta-data are not consistent with each other, the operation cannot be correctly completed. Besides, data stored in a normal data area may be destroyed in some cases.

A method for maintaining consistency as the file system includes a journaling file system which is a method for detecting that consistency in the file system is damaged, and then restoring the file system, and a method for inhibiting consistency in the file system from being damaged, as discussed in Japanese Patent Application Laid-Open No. 2004-272608.

In Japanese Patent Application Laid-Open No. 2004-272608, an area of the file system is partitioned into a data area, a directory slot area, and a cluster chain area. A directory slot corresponds to the above-mentioned directory entry, and a cluster chain corresponds to the above-mentioned FAT. A buffer cache serving as a cache mechanism of the file system is given an immediate recording function and a delay recording function so that the data area, the directory slot area, and the cluster chain area are recorded in this order when data is written into a file. Thus, recording of important meta-data is postponed, which suppresses damage to the file system caused by disconnection of power during the data writing.

In the above-mentioned journaling file system, an area storing extra backup information needs to be ensured, and a load of restoration processing is high. On the other hand, the method discussed in Japanese Patent Application No. 2004-272608 does not consider an Application-Programming-Interface (API) serving as the type of file operation. Therefore, a function of maintaining consistency in the file system is significantly damaged when an API other than a data writing (write ( )) API is used.

SUMMARY

An aspect of the present disclosure is directed to providing a file system that favorably suppresses a defect caused by inconsistency in a file system due to disconnection of power depending on the type of file operation (e.g., the type of API).

According to an aspect of the present disclosure, a file management apparatus, which manages a file by providing a storage device with a data area storing data included in the file, a first meta-data area storing management information representing a usage and a chain of the data area, and a second meta-data area storing index information representing the size of the file, includes a receiving unit configured to receive a file operation instruction, and a control unit configured to update at least two of the data area, the first meta-data area, and the second meta-data area in an order corresponding to the type of the file operation instruction that has been received by the receiving unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the embodiment and, together with the description, serve to explain the principles of the embodiment.

FIG. 5 illustrates a state where a file size and an FAT chain are not consistent with each other.
FIG. 6 illustrates an example of an FAT chain including an error.
FIG. 11 is a flowchart illustrating safe synchronous control in "file contraction" processing.
FIG. 12 is a flowchart illustrating safe synchronous control in "directory generation" processing.
FIG. 13 illustrates APIs in a file system.
FIG. 14 illustrates a flush order for each API.

DESCRIPTION OF THE EMBODIMENTS

Various exemplary embodiments, features, and aspects of the invention will be described in detail below with reference to the drawings.

An exemplary embodiment of the present invention will be described using an FAT file system as an example. The FAT file system is often called an FAT. However, in the present exemplary embodiment, the FAT will be described as a file allocation table.

A configuration of a file system according to the present exemplary embodiment will be described with reference to FIGS. 1 and 2.

Figure 1:
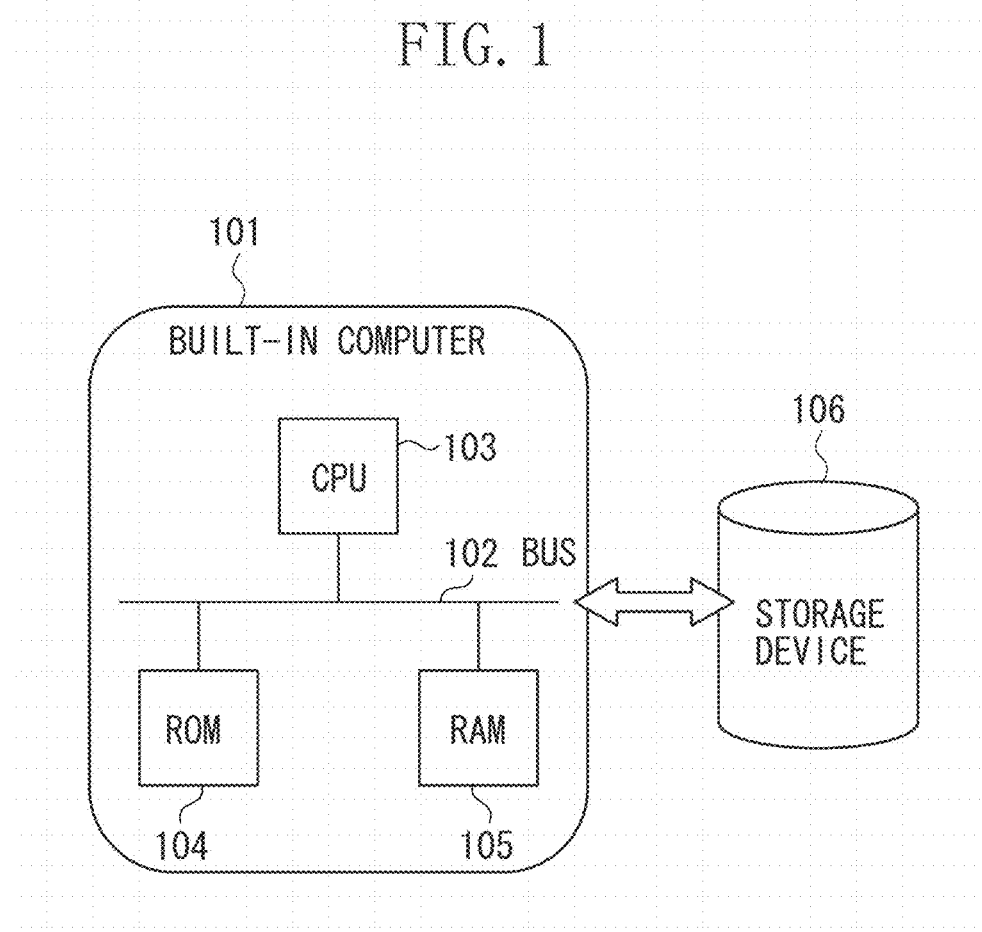
FIG. 1 illustrates the outline of a hardware configuration.

FIG. 1 illustrates the outline of a hardware configuration according to the present exemplary embodiment. A built-in computer 101 includes a bus 102, a CPU 103, a read-only memory (ROM) 104, a random access memory (RAM) 105, and a storage device 106. The storage device 106 may be removably mounted on the built-in computer 101.

Figure 2:
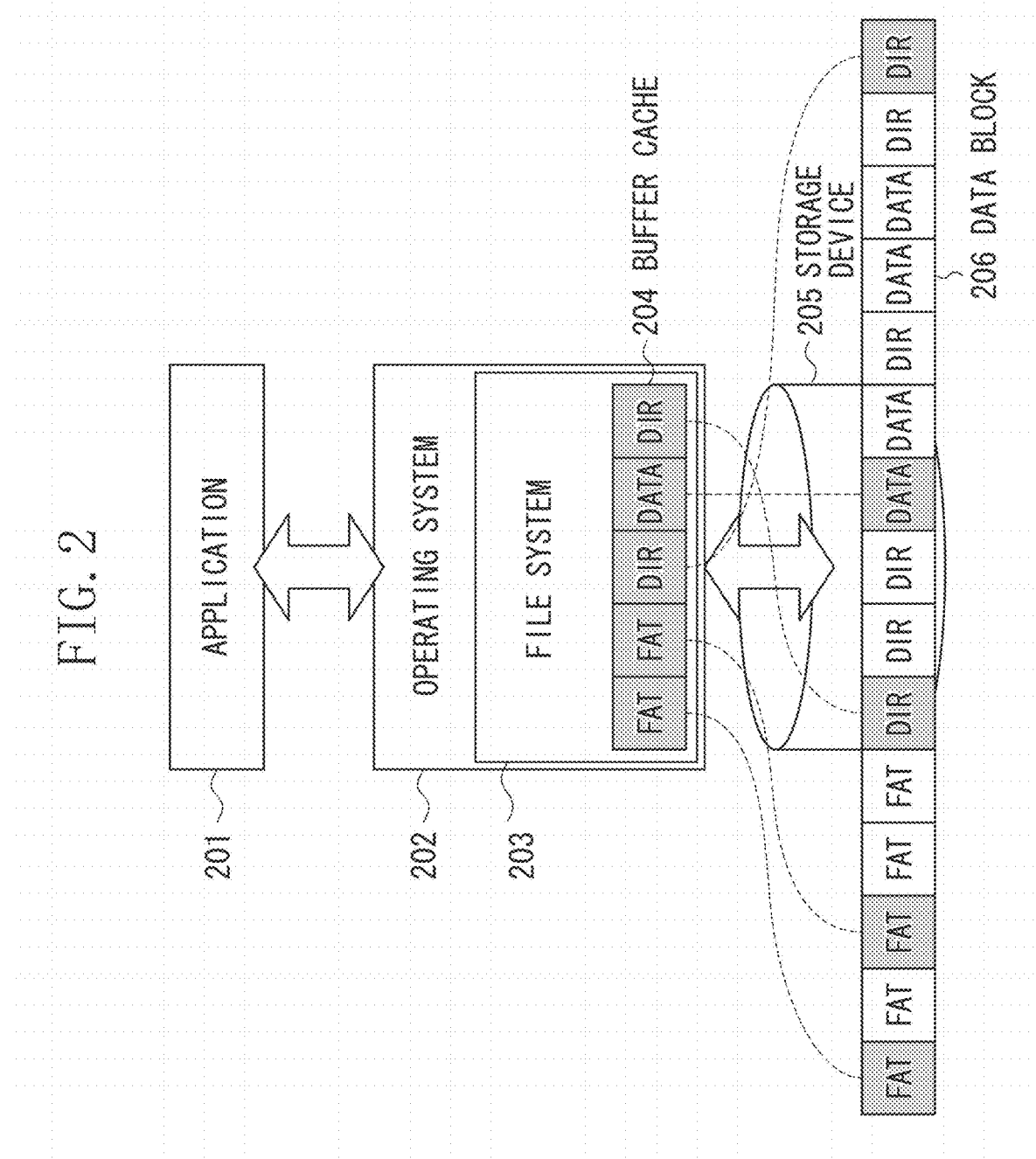
FIG. 2 illustrates the outline of a software configuration.

FIG. 2 illustrates a functional configuration of a file management apparatus according to the present exemplary embodiment. The file management apparatus includes an application program 201, an operating system 202, a file system 203, a buffer cache 204, a storage device 205, and a data block 206.

The CPU 103 of the built-in computer 101 controls the ROM 104, the RAM 105, and the storage device 106, which are connected to one another via the bus 102. The CPU 103 executes an application program and a file system program, which are stored in the ROM 104, to operate a logical file recorded in the storage device 106. In this case, the RAM 105 is used as a work area.

The application program 201 calls various APIs in the file system 203 via the operating system 202 when accessing the storage device 205. FIG. 13 illustrates a list of typical APIs. FIG. 13 illustrates a correspondence among each of the typical APIs in the file system 203, description of a function of the API, and an area to be updated by the API.

While the file system 203 accesses the storage device 205 according to the API called from the application program 201, it temporarily caches an accessed data block 206 of the storage device 205, as cache information into the buffer cache 204 in the file system 203. Consequently, the file system 203 can omit input/output (I/O) processing when accessing the same block next time, realizing a high-speed operation. Further, the file system 203 can collectively process changes to the same block when performing writing into the storage device 205, which improves efficiency. Such a function is particularly effective in FAT and directory entry areas to be rewritten with high frequency. While one buffer cache is used to retain a content of one data block as cache information in FIG. 2, the content of the one data block may be stored using a plurality of buffer caches. The buffer cache can preferably retain a plurality of cache information.

The buffer cache 204 is managed with a Least-Recently-Used (LRU) algorithm in a conventional system. If the buffer cache 204 runs short, a cache corresponding to a block least recently accessed is first written out (flushed) into the storage device 205, and the cache is used for buffering a new area. All caches may be flushed at one time into the storage device 205 when the application 201 explicitly issues synchronization in addition to being automatically flushed with the LRU algorithm.

If consistency between meta data is maintained in the above-mentioned file system 203, it is necessary to manage flushing into the storage device 205 every time an API is executed. For example, when a plurality of APIs are executed without once flushing a cache, caches over various areas, which have been accessed by the previous operation, may be mixed. It is difficult to flush the mixed caches at one time in synchronization so that the consistency in the file system 203 is maintained.

In the present exemplary embodiment, in performing flushing into the storage device 205, recording is performed in an order of areas to be updated suitable for each of writing APIs. As illustrated in the list of APIs in FIG. 13, the area to be updated is determined for each of writing APIs. In FIG. 13, DATA represents a data area, DIR represents a directory entry area, and FAT represents an FAT area.

When attention is focused on "Truncate ( ) (Expansion): file expansion" and "Truncate ( )(contraction): file contraction" in the list of APIs, in both cases, the directory entry area and the FAT area are updated. In the present exemplary embodiment, however, the FAT area is first updated in "file expansion", and the directory entry area is first updated in "file contraction". This is to prevent a phenomenon that the size of a directory entry becomes larger than its actual size so that an unlinked data block is pointed to, in each of the cases (in the following description, a file operation is merely represented by parentheses).

"File expansion" processing will be specifically described with reference to FIG. 4. In "file expansion", an example where buffer caches have not been flushed is illustrated as a buffer cache 404. A data block 4075 is updated as a directory entry area, and data blocks 4061, 4063, 4064, and 4065 are updated as FAT areas. While the data blocks are respectively cached into buffer caches 4041 to 4045, the buffer caches 4041, 4042, 4044, and 4045 serving as the FAT areas are flushed into a storage device 405 prior to the buffer cache 4043 serving as the directory entry area.

States of a directory entry, an FAT, and data blocks at this time will be described with reference to FIG. 5. In an initial state 501 illustrated in FIG. 5, a directory entry has a file size corresponding to one block while only a fifth data block is allocated. 51th and 91th data blocks are allocated to the directory entry from this state, to expand the file size to three blocks.

At this time, an FAT area and a directory entry area each indicated by a dotted line need to be flushed. If the FAT area is first flushed from the initial state 501, a halfway state 502 occurs. "Halfway state" appearing in the following description is a state to which an initial state can transit even when a normal file operation is performed. The halfway state is unlikely to be exposed as long as unexpected accidents such as disconnection of power and inaccessibility to the storage device 405 do not occur.

In the halfway state 502, a directory entry has a file size corresponding to one block while fifth, 51th, and 91th data blocks are allocated. Although inconsistency occurs between the file size of the directory entry and its actual file size, this is not a problem because the directory entry is allocated the data block corresponding to the size (corresponding to one block) of the directory entry to be actually accessed. When the directory entry area is further flushed from this state, consistency between the file size and the actual number of data blocks can safely be achieved.

On the other hand, if the directory entry area is first flushed from the initial state 501, a halfway state 503 occurs. In the halfway state 503, a directly entry has a file size corresponding to three blocks while only a fifth data block is allocated. This becomes a problem because in this case, an area is included which does not exist in the data blocks (three blocks) corresponding to the size of the directory entry to be actually accessed. This causes an error in searching for a data block corresponding to a particular size in file reading, for example.

Further, in "file contraction", a buffer cache serving as a directory entry area is first flushed to previously reduce the file size so that a not actually linked area can be prevented from being pointed to, like in "file expansion".

Thus, the order in which the areas are recorded into the storage device 405 differs depending on a type of file operation (e.g., file expansion and file contraction) or an API. Therefore, a correct order for recording the update target areas is defined for each API so that a safer file system can be implemented.

Further, in the present exemplary embodiment, flushing control of a particular area is performed. For example, in "file expansion", the FAT area and the directory entry area are flushed in this order and recorded into the storage device

405. At this time, the FAT area to be first flushed may exist over a plurality of portions. When the portions are flushed in an irregular order, an FAT cluster chain is temporarily ruptured. When power is disconnected in this state, inconsistency may occur in the file system.

Therefore, in the present exemplary embodiment, such a situation is prevented by protecting a buffer cache including a tail of an FAT cluster chain (a connected state of a file) originally stored in the storage device 405, so that the buffer cache is excluded from a flushing target, and the protection is released at the end of the flushing of the FAT area to flush the buffer cache, in "file expansion".

Consequently, a portion other than the protected buffer cache is first flushed so that the tail of the FAT cluster chain is flushed after the cluster chain in a portion to be extended is completed, and is connected to the completed chain. Therefore, "file expansion" processing can be more safely performed. The tail of the FAT cluster chain corresponds to information representing a tail of the file (first information and third information) in an FAT, and is distinguished from other information (second information) included in the FAT.

Figure 4:
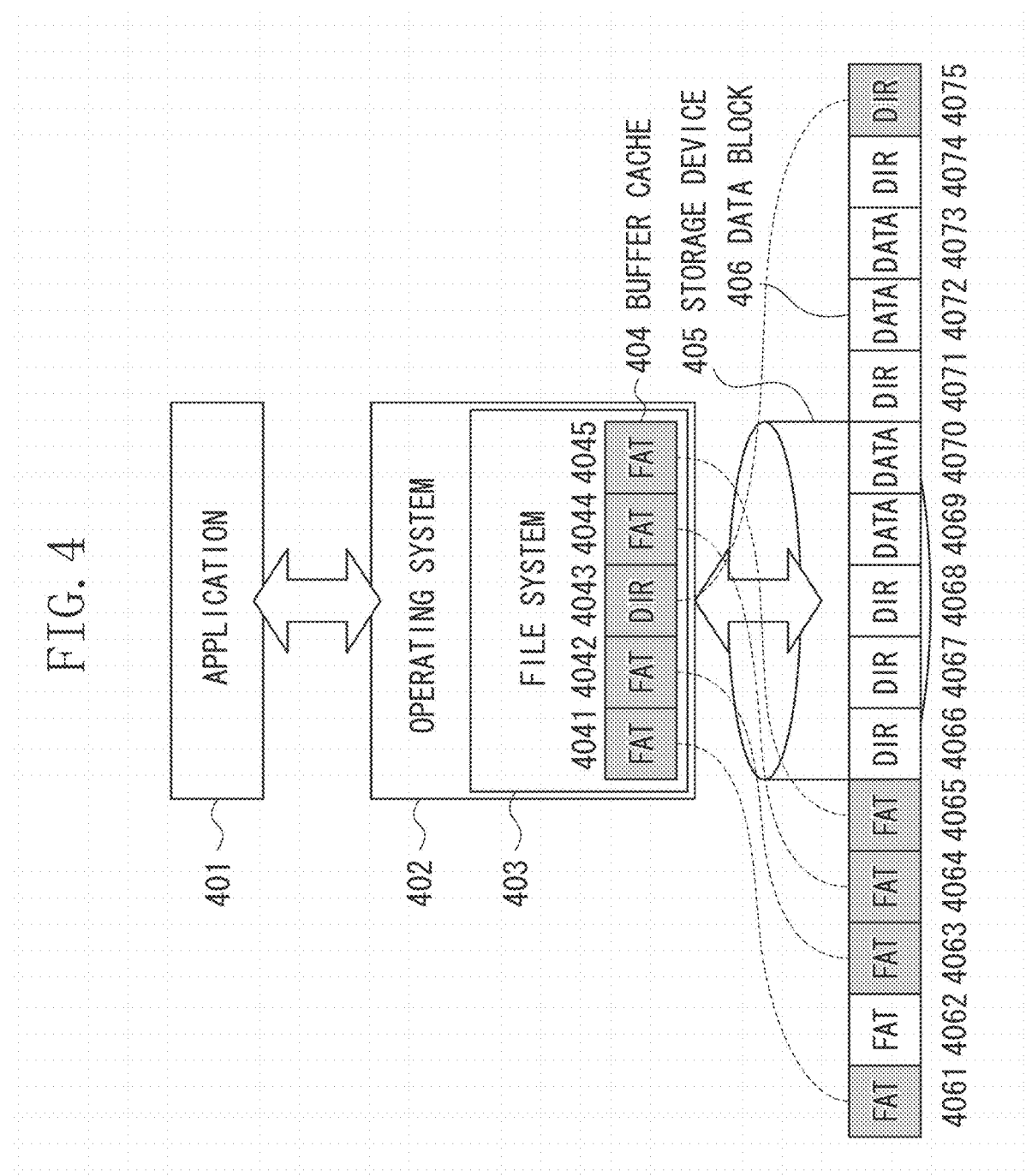
FIG. 4 illustrates the outline of a software configuration.

More specifically, a state before buffer caches are flushed in "file expansion", is illustrated as a buffer cache 404 in FIG. 4. At this time, a data block 4075 is updated as a directory entry area, and data blocks 4061, 4063, 4064, and 4065 are updated as FAT areas. The FAT areas are cached into buffer caches 4041, 4042, 4044, and 4045. The buffer cache 4041 includes a tail of an FAT cluster chain. In the present exemplary embodiment, the buffer cache 4041 is protected at the time point where a change is made thereto. The FAT areas are updated from the buffer caches 4042, 4044, and 4045 in this order.

A state of a directory entry, an FAT, and data blocks at this time will be described with reference to FIG. 6. In an initial state 601 illustrated in FIG. 6, a directory entry has a file size corresponding to one block while only a fifth data block is allocated. 51th and 91th data blocks are allocated to the directory entry from this state, to expand the file size to one corresponding to three blocks. At this time, an FAT area is flushed over three portions in a unit indicated by a dotted line.

When an original FAT is flushed with its tail (an FAT area including the fifth data block) protected, a halfway state 602 occurs if a tail of a file (a tail of an FAT cluster chain) originally stored in the storage device 405 is protected. In the halfway state 602, a directory entry has a file size corresponding to one block while a fifth data block is allocated. Further, 51th and 91th data blocks are chained (connected) to each other. However, this is not a problem because the data blocks do not remain as areas to be accessed. When the protection of the tail of the original FAT is released from the halfway state 602 to flush the FAT, the fifth and 51th data blocks can be normally chained to each other.

On the other hand, when the FAT is disorderly flushed, a halfway state 603 may occur. In the halfway state 603, a directory entry has a file size corresponding to one block while only fifth and 51th data blocks are allocated. This apparently seems to be no problem because there exists a data block corresponding to the size (corresponding to one block) of the directory entry to be actually accessed. However, the 51th data block is in an unused state on the FAT (its value in the FAT area is zero). This may cause an error in processing for sequentially following the FAT in file deletion, for example.

In "file expansion, the flushing of the buffer cache is temporarily suspended so that the safety of the file system 403 can be enhanced, as described above. On the other hand, in "file contraction", the buffer cache can be immediately flushed so that the safety of the file system 403 can be enhanced (details thereof will be described below). Thus, the flushing of the buffer cache is temporarily suspended (or the buffer cache is immediately flushed) so that a safer file system can be implemented.

Figure 3:
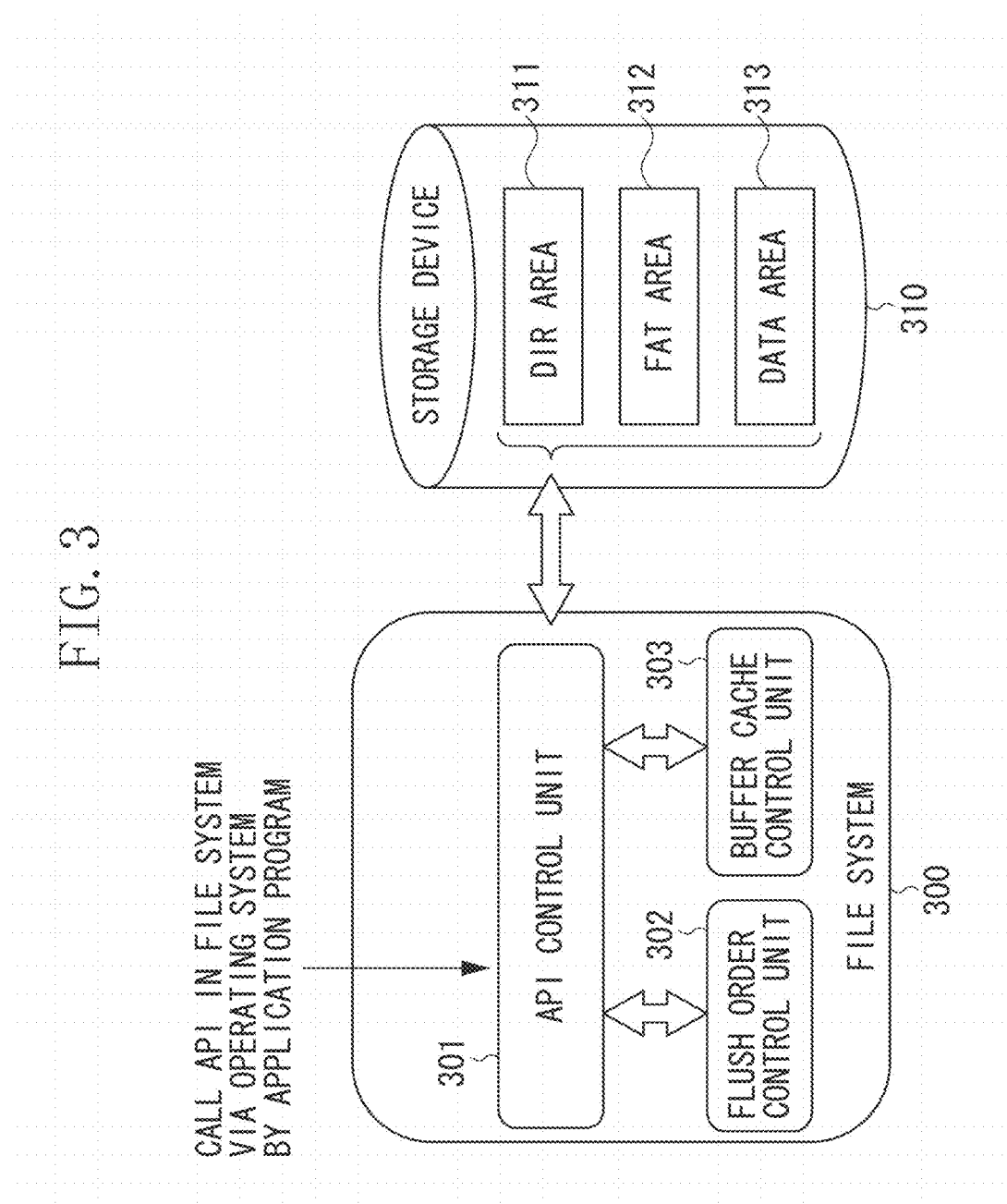
FIG. 3 illustrates the outline of a functional configuration of a file system according to a first exemplary embodiment.

FIG. 3 illustrates a conceptual functional configuration of a file system (a file management apparatus) 300 according to the present exemplary embodiment.

As illustrated in FIG. 3, the file system 300 includes an API control unit 301, a flush order control unit 302, and a buffer cache control unit 303. A storage device 310 includes a directory entry area (second meta-data area) 311 previously formatted so that the file system 300 according to the present exemplary embodiment can be used and storing a directory entry including index information, an FAT area (first meta-data area) 312 storing a file allocation table including management information representing a usage and a chain of a data area, and a data area 313.

A buffer cache (not illustrated) in the buffer cache control unit 303 may be a storage area in the RAM 105 managed by the file system 300. The buffer cache caches contents to be recorded in the directory entry area 311, the FAT area 312, and the data area 313 in the storage device 310. The buffer cache also functions as a buffer. More specifically, the buffer cache reads out a content of an access target in the storage device 310, which is determined by the API control unit 301, into the buffer cache, updates the content according to a file operation of the API control unit 301, and writes back the updated content to the access target.

The flush order control unit 302 has information for defining a flush order of APIs (including a flush order within an FAT), like in a table illustrated in FIG. 14. The information need not be actually retained as a table. The information may be referenced as a library from the file system 300, or may be embedded in a code of each of APIs within the file system 300.

The API control unit 301 accesses the flush order control unit 302 when it receives an API call (a first file operation instruction and a second file operation instruction) via the operating system 202 or the application program 201, and writes out, if a flush order is retained in an API, data, which is buffered by the buffer cache 303, into the storage device 310 according to the flush order. For an API in which a flush order is not retained, the DATA area 313, the directory entry area 311, and the FAT area 312 may be flushed in a fixed order, or may be disorderly flushed. While the buffer cache has been used in the present exemplary embodiment, the buffer cache is not necessarily used. In this case, at least two of the directory entry area 311, the FAT area 312, and the data area 313 may be updated in an order corresponding to the type of the file operation instruction.

The API control unit 301 performs control to finally write out a data block after writing out all other FAT areas if "suspend" is displayed as a flush order in the FAT area 312. On the other hand, the API control unit 301 performs control to write out the data block preferentially prior to the other FAT areas if "immediate" is displayed.

The following describe a control flow by the API control unit 301 for the file management apparatus according to the present exemplary embodiment illustrated in FIG. 3 to record a buffer cache in an appropriate order for each type of file operation (for each API in the following description) based on a flush order (and the presence or absence of protection of a tail of an FAT) illustrated in FIG. 14.

<File Generation: Open ( ), Creat ( )>

Figure 7:
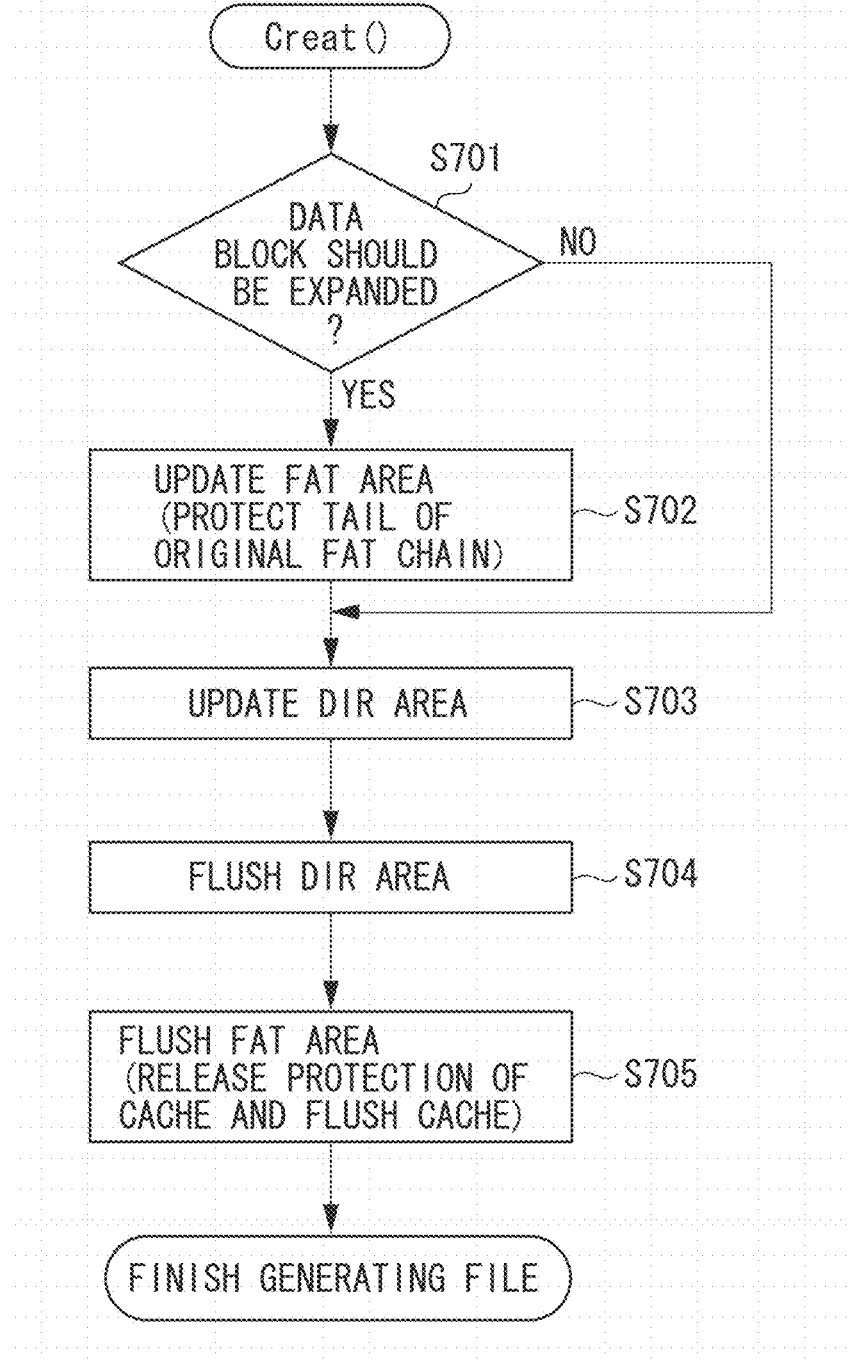
FIG. 7 is a flowchart illustrating safe synchronous control in "file generation" processing.

Generally, an area where writing is carried out when a file is generated is only an area in which a directory entry newly generated is written. If there is no free area in a directory in which a directory entry is to be written, however, the directory is expanded. In this case, writing is also generated in the FAT area 312 in addition to the directory entry area 311. Synchronous control in the file generation processing by the file management apparatus according to the present exemplary embodiment will be described with reference to a flowchart of FIG. 7.

In step S701, the API control unit 301 confirms whether there is a sufficient free area in a directory in which a file is generated. If there is a free area (YES in step S701), the processing proceeds to step S703. In step S703, the API control unit 301 generates a directory entry. If there is no free area (NO in step S701), the processing proceeds to step S702 to expand the directory.

In step S702, the API control unit 301 updates the FAT area 312 for only a buffer cache to connect a free data block to an original directory. Flushing into the storage device 310 is not performed until the directory entry area 311 is flushed to prevent the directory from being linked to an indefinite area. Further, a buffer cache including a tail of an original FAT chain is protected from replacement to suspend flushing so that the tail of the original FAT chain is not written into the storage device 310 before final flushing.

In step S703, the API control unit 301 clears a data block newly acquired to zero and generates a directory entry. Clearing the data block to zero consumes a large number of buffer caches. Therefore, the buffer caches may be frequently replaced. However, the buffer cache only, which has been protected in step S702, is excluded from a replacement target and remains without being flushed. Therefore, the indefinite area is not linked. If the processing jumps from step S701 to step S702, the necessity of clearing the data block to zero is eliminated and only the directory entry is generated.

In step S704, the API control unit 301 flushes only the directory entry area 311. Owing to the replacement in step S703, some of the buffer caches may have already been flushed. Therefore, the remaining area is a target.

In step S705, the API control unit 301 finally flushes the FAT area 312. At this time, the FAT area 312 is flushed without changing the buffer cache that has been protected in step S702. The API control unit 301 then releases the protection of the buffer cache that has been protected in step S702, and flushes the buffer cache. If the processing reaches step S704 after jumping from step S701 to step S703, the processing performed in step S705 is not required.

<Data Writing into File: Write ( )>

Figure 8:
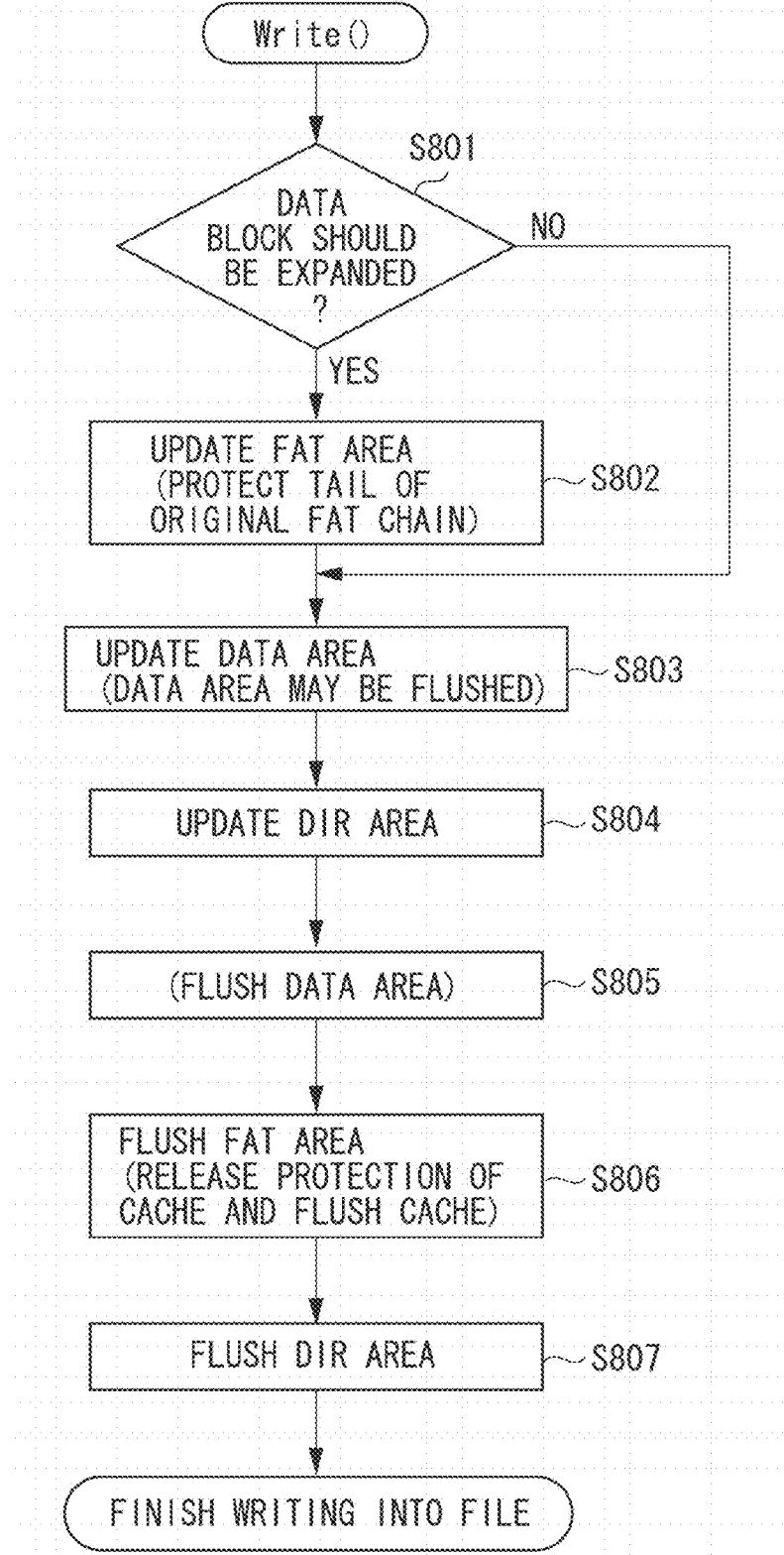
FIG. 8 is a flowchart illustrating safe synchronous control in "data writing into file" processing.

In writing of data into a file, writing into the FAT area 312, in addition to the data area 313 and the directory entry area 311, is required if a new area is ensured. The procedure for synchronous control most suitable in "data writing into file" will be described with reference to a flowchart of FIG. 8.

In step S801, the API control unit 301 first confirms whether there is a sufficient free area in an area in which data is to be written. If there is a free area (YES in step S801), the processing proceeds to step S803. In step S803, the API control unit 301 writes the data. If there is no free area (NO in step S801), the processing proceeds to step S802 to expand the file.

In step S802, the API control unit 301 updates the FAT area 312 for only a buffer cache to connect a free data block to an original file. Flushing into the storage device 310 cannot be performed until the data area 313 is flushed to prevent the file from being linked to an indefinite area. Further, a buffer cache including a tail of an original FAT chain is protected from replacement to suspend flushing so that the tail of the original FAT chain is not written into the storage device 310 before final flushing.

In step S803, the API control unit 301 writes data. Writing the data consumes a large number of buffer caches. Therefore, the buffer caches may be frequently replaced. However, the buffer cache only, which has been protected in step S802, is excluded from a replacement target and remains without being flushed. Therefore, the indefinite area is not linked. The data area 313 is accessed less frequently and is first flushed into the storage device 310 in "data writing into file". Accordingly, at this time point, the data area 313 may be directly flushed into the storage device 310 without passing through the buffer cache.

In step S804, the API control unit 301 updates the directory entry area 311 for only a buffer cache to change the size of the file. Flushing into the storage device 310 cannot be performed until the FAT area 312 is flushed to prevent the directory entry from pointing to an unlinked area. The buffer cache only, which has been protected in step S802, is excluded from a replacement target and remains without being flushed. Therefore, the indefinite area is not linked.

In step S805, the API control unit 301 flushes only the data area 313. If the data area 313 is directly written into the storage device 310 in step S803, the processing performed in step S805 is not required.

In step S806, the API control unit 301 flushes only the FAT area 312. At this time, the FAT area 312 is flushed without changing the buffer cache that has been protected in step S802. The API control unit 301 then releases the protection of the buffer cache that has been protected in step S802, and flushes the buffer cache. If the processing reaches step S806 after jumping from step S801 to step S803, the processing performed in step S806 is not required.

In step S807, the API control unit 301 finally flushes the directory entry area 311.

<File Deletion: Unlink ( )>

Figure 9:
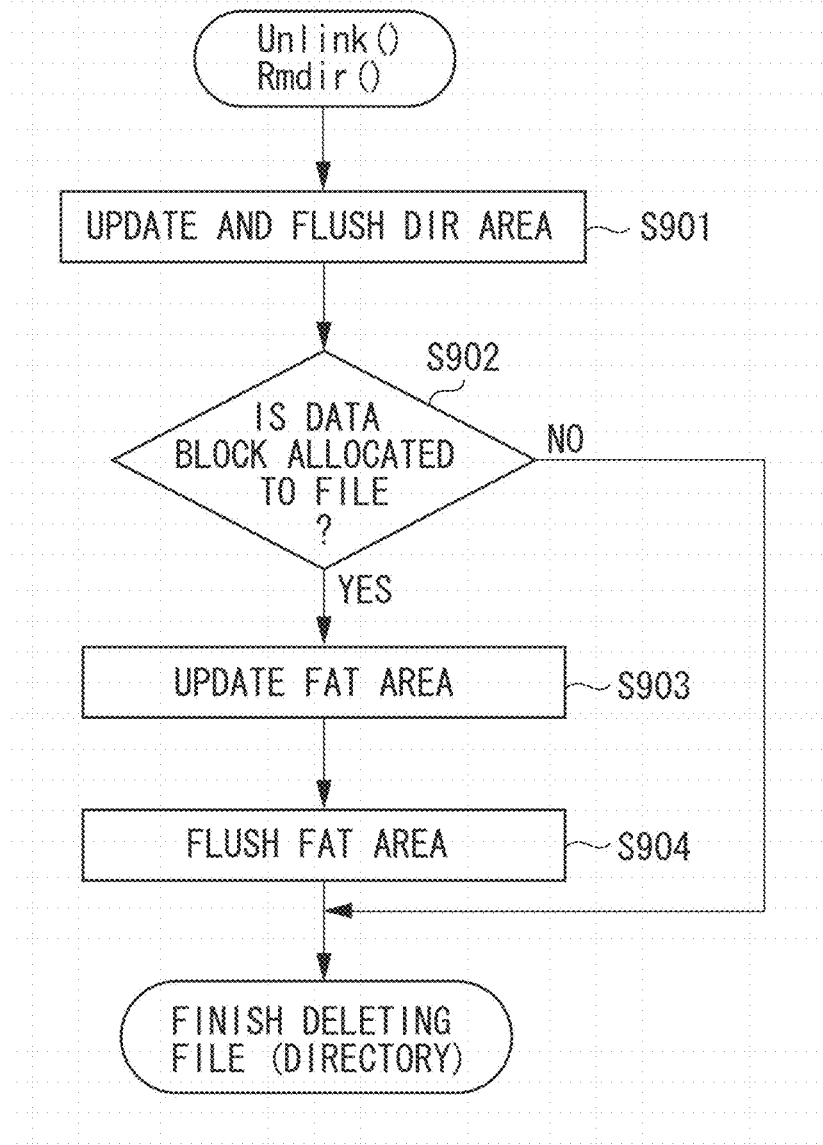
FIG. 9 is a flowchart illustrating safe synchronous control in "file deletion" processing.

If a file to which a data block is allocated is deleted, writing into the directory entry area 311 and the FAT area 312 is required. As to a file to which a data block is not allocated, only writing into the directory entry area 311 is performed. The procedure for synchronous control in file deletion processing by the file management apparatus according to the present exemplary embodiment will be described with reference to a flowchart of FIG. 9.

First, in step S901, the API control unit 301 deletes a directory entry. The updated directory entry area 311 is immediately flushed into the storage device 310 to prevent a data block to be released from referencing.

In step S902, the API control unit 301 then confirms whether a data block is allocated to a file to be deleted. If the data block is not allocated (NO in step S902), the processing ends. If the data block is allocated (YES in step S902), the processing proceeds to step S903 to release the data block.

In step S903, the API control unit 301 updates the FAT area 312 for a buffer cache to release the data block that has been allocated to the file. The directory entry has already been deleted, therefore, no allocated data block is referenced. Therefore, flushing at unanticipated timing in replacing the buffer cache is not a concern.

In step S904, the API control unit 301 finally flushes the FAT area 312. Since some buffer caches have already been flushed by the replacement in step S903, the remaining area is a flush target.

<File Expansion: Truncate ( ) (Expansion)>

Figure 10:
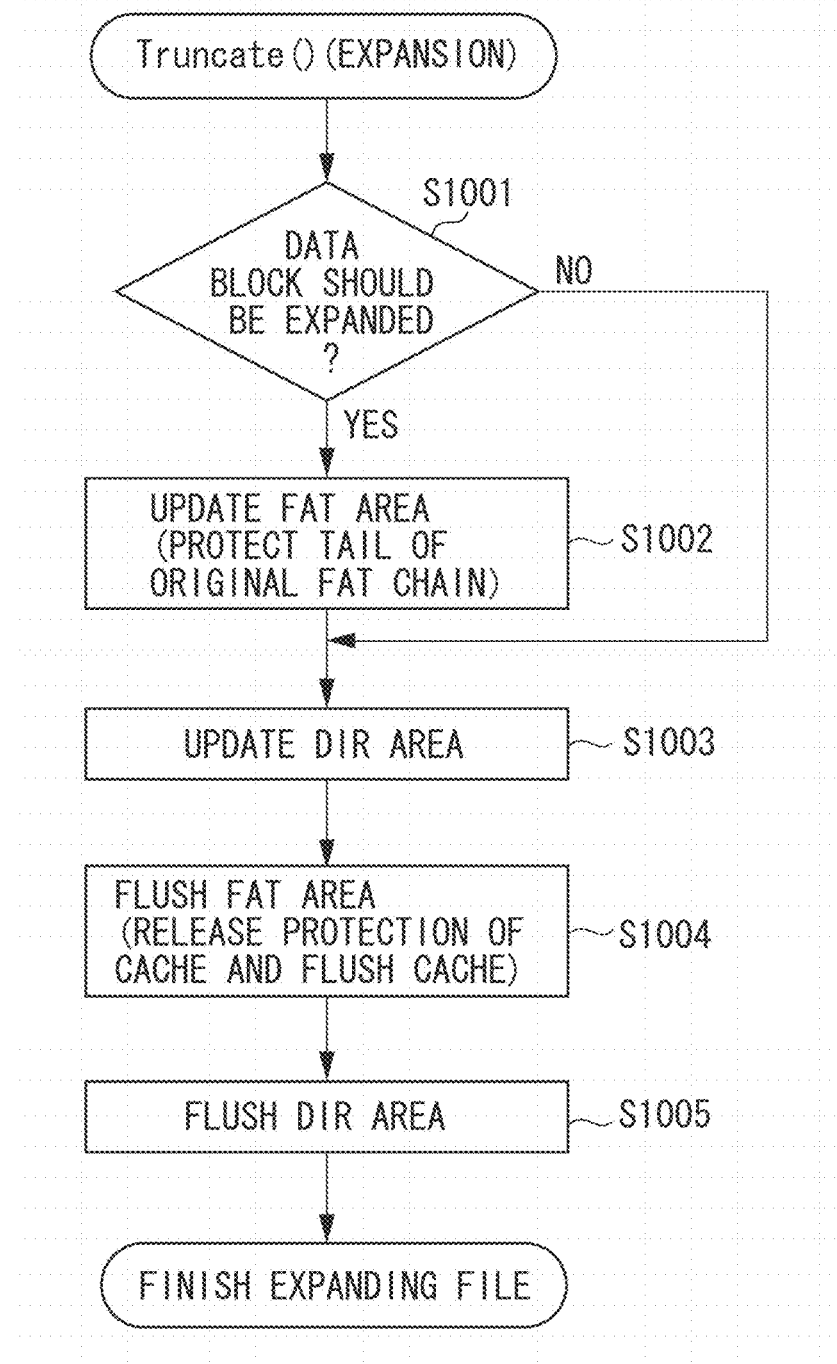
FIG. 10 is a flowchart illustrating safe synchronous control in "file expansion" processing.

"File expansion" is the same as "data writing into file" except that data writing is not carried out. Accordingly, an area to be updated is the directory entry area 311 and the FAT area 312. In writing zero into an expanded area, the recording procedure is entirely the same as the procedure for "data writing into file". The procedure for synchronization processing for expansion processing by the file management apparatus according to the present exemplary embodiment will be described with reference to a flowchart of FIG. 10.

In step S1001, the API control unit 301 first confirms whether a designated file size requires connection of a new data block. If the connection is not required (NO in step S1001), the processing proceeds to step S1003. In step S1003, the API control unit 301 updates a directory entry. If the connection is required (YES in step S1001), the processing proceeds to step S1002 to expand a file.

In step S1002, the API control unit 301 updates the FAT area 312 for only a buffer cache to connect a free data block to an original file. A buffer cache including a tail of an original FAT chain is protected from replacement to suspend flushing so that updating of the tail of the original FAT chain is not flushed into the storage device 310 before final flushing.

In step S1003, the API control unit 301 updates the directory entry area 311 for only a buffer cache to change the size of the file. Flushing into the storage device 310 cannot be performed until the FAT area 312 is flushed to prevent the directly entry from pointing to an unlinked area. The buffer cache only, which has been protected in step S1002, is excluded from a replacement target and remains without being flushed. Even if the buffer cache is replaced, therefore, an indefinite area is not linked.

In step S1004, the API control unit 301 flushes only the FAT area 312. At this time, the FAT area 312 is flushed without changing the buffer cache that has been protected in step S1002. The API control unit 301 then releases the protection of the buffer cache that has been protected in step S1002, and flushes the buffer cache. If the processing reaches step S1004 after jumping from step S1001 to step S1003, the processing performed in step S1004 is not required.

In step S1005, the API control unit 301 finally flushes the directory entry area 311.

<File Contraction: Truncate ( ) (Contraction)>

"File contraction" is basically performed in order opposite to "file expansion", and differs from "file expansion" in that the directory entry area 311 is not cleared to zero due to the nature of contraction. The procedure for synchronous control will be described with reference to a flowchart of FIG. 11 for file contraction processing by the file management apparatus according to the present exemplary embodiment.

In step S1101, the API control unit 301 changes the file size of a directory entry. To prevent a data block to be released from referencing, the updated directory entry area 311 is immediately flushed into the storage device 310.

In step S1102, the API control unit 301 then confirms whether a designated file size requires release of the existing data block. If the release is not required (NO in step S1102), the processing ends. If the release is required (YES in step S1102), the processing proceeds to step S1103 to release a file.

In step S1103, the API control unit 301 updates the FAT area 312 for only a buffer cache to release a free data block from an original file. Only a buffer cache including a tail of an FAT chain after contraction is immediately flushed so that updating of any portion of the FAT chain may be flushed into the storage device 310 before final flushing.

In step S1104, the API control unit 301 finally flushes the FAT area 312. At this time, the buffer cache including the tail of the FAT chain after contraction in step S1103 has already been flushed. Therefore, no problem occurs, no matter how updating of the remaining FAT chain is written into the storage device 310.

<Directory Generation: Midir ( )>

"Directory generation" has a two-stage procedure including ensuring a new data block and generating a directory entry. From such a characteristic, flushing is generated two times for each of areas, i.e., the directory entry area 311 and the FAT area 312 in "directory generation". The same step as that in "file generation" may be taken to generate the directory entry. Therefore, a procedure for ensuring the data block is mainly described herein. The procedure for synchronous control most suitable in "directory generation" will be described with reference to a flowchart of FIG. 12.

In step S1201, the API control unit 301 updates the FAT area 312 for only a buffer cache to ensure a free data block. This area is not referenced from anywhere as long as the directory entry is not generated. Therefore, the area may be flushed at any time before the directory entry is generated. However, the buffer cache including an ensured FAT is protected from replacement to suspend flushing not to waste the area as far as possible.

In step S1202, the API control unit 301 then clears a data block newly acquired to zero. Clearing the data block to zero consumes a large number of buffer caches. Therefore, the buffer caches may be frequently replaced. However, the buffer cache only, which has been protected in step S1201, is excluded from a replacement target and remains without being flushed so that an indefinite area would not become a used area.

In step S1203, the API control unit 301 flushes the directory entry area 311.

In step S1204, the API control unit 301 flushes the FAT area 312. Only a portion of the FAT area 312 corresponding to the data block that has been ensured in step S1202 is flushed in step S1204. The portion is protected at the time point where the processing reaches step S1204, and thus is flushed after the protection thereof is released.

In step S1205, the API control unit 301 finally performs processing for generating the directory entry in the same recording procedure as that in "file generation".

<Directory Deletion: Rmdir ( )>

"Directory deletion" is similar to the "file deletion" processing except that they differ only in that a data block to be deleted is a file or a directory, and hence details thereof are not repeated.

<Changes of Name of File Directory/Access Right/Time Stamp: Rename ( ), Chmod ( ), Utime ( )>

Relevant areas to be updated are only the directory entry area 311 for the APIs. Therefore, complicated synchronous control is not required.

While the above-mentioned exemplary embodiment has been described based on the FAT file system, the present embodiment is also applicable to a file system including a data area such as an FAT, a directory entry area, and an FAT area (an area representing a chain of a data block). In the present embodiment, an algorithm in managing a buffer cache is not limited to LRU.

While the typical APIs in the file system have been described in the above-mentioned exemplary embodiment, the present embodiment can be applied to APIs such as "file connection" and "file division" to improve the safety of the file system.

While for each of the typical APIs in the file system, corresponding processing (corresponding processing for updating areas according to an updating order) is illustrated in the above-mentioned exemplary embodiment, robustness of the file system can be enhanced by applying the present embodiment if two or more APIs, which differ in an updating order, in at least two areas are executed.

The present disclosure is also implemented by performing the following processing. More specifically, software (a program) for implementing a function in the above-mentioned exemplary embodiment is supplied to a system or an apparatus via a network or various types of storage media or a computer (or a CPU or a microprocessor unit (MPU)) in the system or the apparatus reads out and executes the program.

The computer program according to the present invention can be read out from a computer readable storage medium and executed by the computer. A hard disk device, an optical disk, a compact disk read-only memory (CD-ROM), a compact disk-recordable (CD-R), a memory card, and the ROM may be used as the computer readable storage medium. Further, the computer program according to the present invention may be provided by an external apparatus via a communication interface and executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-239461 filed Oct. 31, 2011, which is hereby incorporated by reference herein in its entirety.

What is claimed is:

1. A file management apparatus that manages a file by providing a non-transitory storage device with a data area storing data included in the file, a first meta-data area storing management information representing a usage and a chain of the data area, and a second meta-data area storing index information representing the size of the file, the file management apparatus comprising:
    a receiving unit configured to receive a first file operation instruction and a second file operation instruction; and
    a control unit configured to change an order of updating of the data area, the first meta-data area, and the second meta-data area corresponding to a type of the first file operation instruction and a type of the second file operation instruction that has been received by the receiving unit,
    wherein the control unit performs control to update at least two of the data, the management information, and the index information in different orders, responsive to the first file operation instruction and the second file operation instruction.

2. The file management apparatus according to claim 1, wherein when the type of the first file operation instruction, which has been received by the receiving unit, corresponds to processing for generating the file, the control unit performs control to update the management information in the storage device after updating the index information in the storage device.

3. The file management apparatus according to claim 1, wherein when the type of the first file operation instruction, which has been received by the receiving unit, corresponds to processing for writing data into the file, the control unit performs control to update the data, update the management information after updating the data, and then update the index information after updating the management information for the storage device.

4. The file management apparatus according to claim 1, wherein when the type of the first file operation instruction, which has been received by the receiving unit, corresponds to processing for deleting the file, the control unit performs control to update the management information in the storage device after updating the index information in the storage device.

5. The file management apparatus according to claim 1, wherein when the type of the first file operation instruction, which has been received by the receiving unit, corresponds to processing for expanding the file, the control unit performs control to update the index information in the storage device after updating the management information in the storage device.

6. The file management apparatus according to claim 1, wherein when the type of the first file operation instruction, which has been received by the receiving unit, corresponds to processing for contracting the file, the control unit performs control to update the management information in the storage device after updating the index information in the storage device.

7. The file management apparatus according to claim 1, further comprising
    a buffer cache configured to retain a plurality of contents of an access target in the storage device, as cache information with respect to the first file operation instruction,
    wherein the control unit includes an updating unit configured to update the cache information cashed in the buffer cache according to a content of the first file operation instruction, and a writing unit configured to write out the cache information, which has been updated by the updating unit, into the access target in the storage device in the order corresponding to the type of the first file operation instruction.

8. The file management apparatus according to claim 1, wherein when the type of the first file operation instruction, which has been received by the receiving unit, corresponds to processing for generating the file, the control unit performs control to update management information at a tail of the file stored in the storage device, for the file to be generated by the generation processing, after writing out another management information relating to the generation processing into the storage device.

9. The file management apparatus according to claim 1, wherein when the type of the first file operation instruction, which has been received by the receiving unit, corresponds to processing for writing into the file, the control unit performs control to update management information at a tail of the file stored in the storage device, after writing out another management information relating to the writing processing.

10. The file management apparatus according to claim 1, wherein when the type of the first file operation instruction, which has been received by the receiving unit, corresponds to processing for expanding the file, the control unit performs control to update management information at a tail of the file stored in the storage device, after writing out another management information relating to the expansion processing into the storage device.

11. The file management apparatus according to claim 1, wherein when the type of the first file operation instruction that has been received by the receiving unit corresponds to processing for contracting the file, the control unit performs control to write out cache information including a tail of an FAT (File Allocation Table) chain relating to a file to be contracted by the contraction processing, into the storage device, before writing out another cache information relating to the management information.

12. The file management apparatus according to claim 1, wherein when the type of the first file operation instruction, which has been received by the receiving unit, corresponds to processing for generating a directory entry, the control unit performs control to protect, to ensure a data area where the directory entry is generated, a cache of an FAT (File Allocation Table) relating to the data area to be ensured and write out information relating to the protected cache of the FAT (File Allocation Table) after writing out index information and cache information relating to another FAT (File Allocation Table) to ensure the data area, and then in order to generate a file relating to the directory entry, to update the index information in the storage device after updating the management information in the storage device and update management information at a tail of the file stored in the storage device for the file to be generated after writing out another management information relating to the generation processing into the storage device.

13. The file management apparatus according to claim 1, wherein when the type of the first file operation instruction, which has been received by the receiving unit, corresponds to processing for deleting the directory, the control unit performs control to update the management information in the storage device after updating the index information in the storage device.

14. The file management apparatus according to claim 1, wherein the type of the first file operation instruction is a type of API (Application-Programming-Interface).

15. A file management apparatus that manages a file by providing a non-transitory storage device with a plurality of blocks storing data, a file allocation table storing management information representing a usage and a chain of the plurality of blocks, and a directory entry storing index information representing the size of the file, the file management apparatus comprising:

a receiving unit configured to receive a first file operation instruction and a second file operation instruction; and a control unit configured to perform control to change an order of updating of at least one block, the file allocation table, and the directory entry corresponding to a type of the first file operation instruction and a type of the second file operation instruction that has been received by the receiving unit, wherein the control unit performs control to update at least two of the block, the file allocation table, and the directory entry in different orders, responsive to the first file operation instruction and the second file operation instruction.

16. A file management method for managing a non-transitory storage device including a data area storing data included in a file, a first meta-data area storing management information representing a usage and a chain of the data area, and a second meta-data area storing index information representing the size of the file, the method comprising:

receiving a first file operation instruction and a second file operation instruction; and changing an order of updating of the data area, the first meta-data area, and the second meta-data area corresponding to a type of the received first file operation instruction and a type of the received second file operation instruction, wherein the changing the order of updating comprises performing control to update at least two of the data, the management information, and the index information in different orders, responsive to the first file operation instruction and the second file operation instruction.

17. A file management method for managing a non-transitory storage device including a plurality of blocks storing data, a file allocation table storing management information representing a usage and a chain of the plurality of blocks, and a directory entry storing index information representing the size of the file, the method comprising:

receiving a first file operation instruction and a second file operation instruction; and changing an order of updating of at least one block, the file allocation table, and the directory entry corresponding to a type of the received first file operation instruction and a type of the received second file operation instruction, wherein the changing the order of updating comprises performing control to update at least two of the block, the file allocation table, and the directory entry in different orders, responsive to the first file operation instruction and the second file operation instruction.

18. A non-transitory computer-readable storage medium storing a program causing a computer to execute the method for a file system, which manages a data area storing data included in a file, a first meta-data area storing management information representing a usage and a chain of the data area, and a second meta-data area storing index information representing the size of the file, the method comprising:

receiving a first file operation instruction and a second file operation instruction; and changing an order of updating of the data area, the first meta-data area, and the second meta-data area corresponding to a type of the received first file operation instruction and a type of the received second file operation instruction, wherein the changing the order of updating comprises performing control to update at least two of the data, the management information, and the index information in different orders, responsive to the first file operation instruction and the second file operation instruction.

19. A non-transitory computer-readable storage medium storing a program causing a computer to execute the method for a file system, which manages a plurality of blocks storing data, a file allocation table storing management information representing a usage and a chain of the plurality of data area, and a directory entry storing index information representing the size of the file, the method comprising:

receiving a first file operation instruction and a second file operation instruction; and changing an order of updating of at least one block, the file allocation table, and the directory entry corresponding to a type of the received first file operation instruction and a type of the received second file operation instruction, wherein the changing the order of updating comprises performing control to update at least two of the block, the file allocation table, and the directory entry in different orders, responsive to the first file operation instruction and the second file operation instruction.

\* \* \* \* \*